Dec. 30, 1924.
G. L. BEAN
1,521,067
CAMERA
Filed Feb. 28, 1922   2 Sheets-Sheet 1
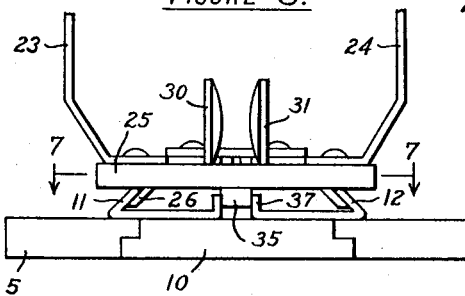
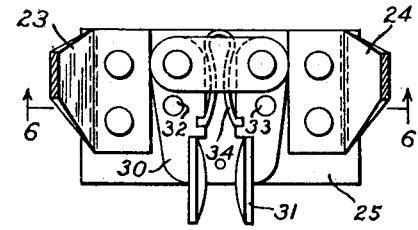
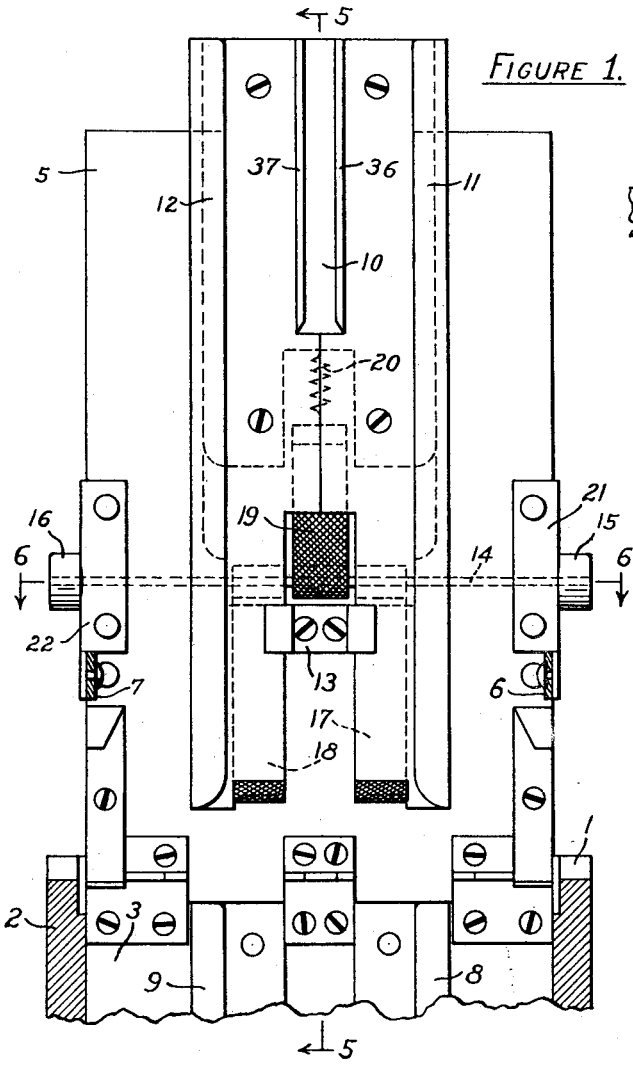
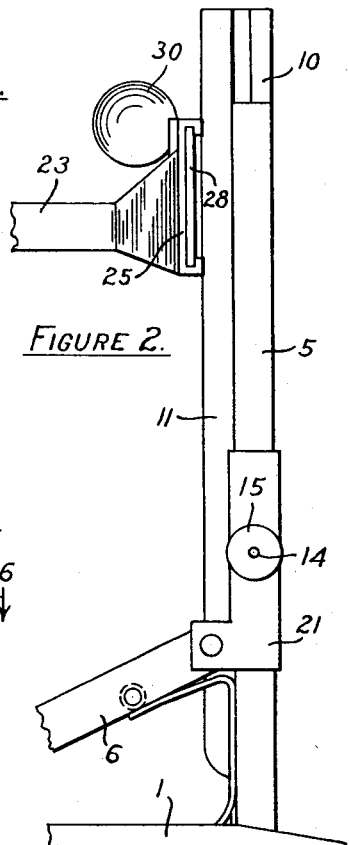
INVENTOR
Grace L. Bean Dec. 30, 1924.
G. L. BEAN
CAMERA
Filed Feb. 28, 1922
1,521,067
2 Sheets-Sheet 2
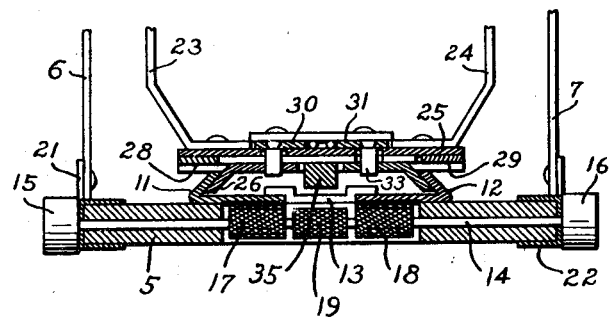
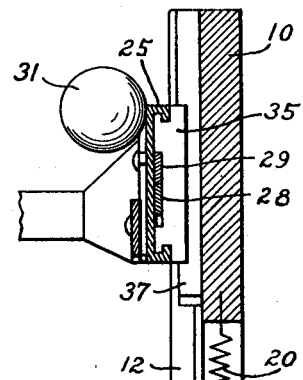
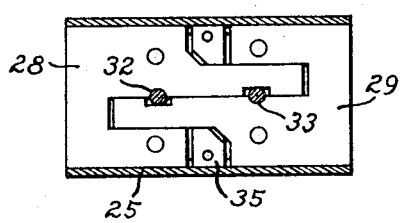
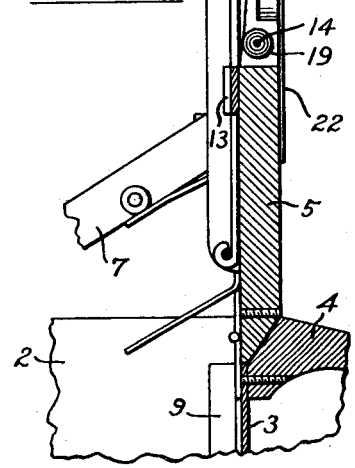
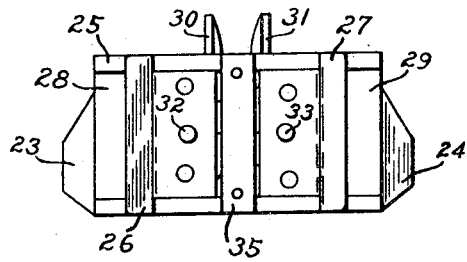
INVENTOR
Grace L. Bean.

Patented Dec. 30, 1924.

1,521,067

UNITED STATES PATENT OFFICE.

GRACE L. BEAN, OF WASHINGTON, DISTRICT OF COLUMBIA.

CAMERA.

Application filed February 28, 1922. Serial No. 539,962.

*To all whom it may concern:*

Be it known that I, GRACE L. BEAN, a citizen of the United States, residing in the city of Washington, District of Columbia, have invented certain new and useful Improvements in Cameras, of which the following is a specification.

This invention relates to adjusting or focussing mechanisms for folding cameras, my object being to simplify the construction thereof and at the same time make them easier to manufacture and capable of greater precision. In devices of this character a rack and pinion is usually employed. This not only adds considerably to the weight, but does not work very smoothly. I eliminate such mechanism entirely by my improved construction, in which I can employ bands of flexible material such as tightly woven cloth to adjust the lens support or pedestal. These bands may be in a position entirely concealed from view, and if made of cloth, may be dusted with talcum powder to reduce friction.

I have also made certain improvements in the lens supporting pedestal whereby the pedestal will be positively drawn down upon the guides, so as to be firmly seated upon the latter, and I have also provided a special guiding connection between the pedestal and the bed whereby the pedestal will be prevented from turning sidewise but will at all times be maintained in exact parellelism with the sensitized surface in the back of the camera. This application is a continuation in part of application Serial Number 389,307, filed June 16, 1920.

Fig. 1 is a plan view of the pivoted bed with a portion of the camera shown in cross section; Fig. 2 is a side view of the pivoted bed and a portion of the camera and pedestal; Fig. 3 is a front view of the pivoted bed and a portion of the pedestal; Fig. 4 is a plan view of the pedestal, partly in cross section; Fig. 5 is a side view of the bed and a portion of the camera and pedestal in longitudinal cross section on the line 5—5 of Fig. 1; Fig. 6 is a transverse cross section through the bed of the line 6—6 of Fig. 1, and through the pedestal on the line 6—6 of Fig. 4; Fig. 7 is a horizontal cross section through the pedestal on the line 7—7 of Fig. 3; and Fig. 8 is a bottom plan view of the pedestal.

The camera is provided with side walls 1 and 2, preferably of wood, and transverse members 3 and 4 to which the bed 5 is hinged, the usual braces 6 and 7 being connected thereto for holding the bed in fixed angular position. Guides 8 and 9 are secured to the transverse member 3 for supporting the pedestal while the camera is folded up.

The pivoted bed 5 is formed bifurcated at its outer end and between the two arms of the bifurcated portion slides a movable block 10, the lateral edges of the block 10 underlapping the bed 5, while a pair of guides 11 and 12 are secured to the upper surface of the block 10 and overlap the bed, so that the movable block 10 can move only in a straight line. A clip 13 is secured near the central portion of the bed and overlaps the adjacent edges of the guides 11 and 12 so as to form a pair of abutments therefor and maintain them in correct position when the slidable block 10 is moved forwards. The guides 11 and 12 are of substantially the same length as the bed 5. Their forward portions are secured to the block 10 while their rearward portions extend freely over the rear half of the bed 5 and when the bed is in contracted position, come very near to the guides 11 and 12 so that the pedestal may be readily moved from one set of guides to the other. Herein I have shown the guides 11 and 12 formed of two separate pieces of sheet metal, but they may obviously be formed of a single piece.

Through the central portion of the bed 5 extends a thin shaft 14 of tempered steel carrying a pair of knurled heads 15 and 16. The central portion of the shaft passes through the open space between the bifurcations of the bed and has wound thereon three bands of flexible material, such as tightly woven linen. The two outer bands 17 and 18 are connected to the rear ends of the guides 11 and 12 respectively in any suitable manner. The middle band 19 is extended forwardly and connected to the block 10 by means of a spring 20, an opening being cut in the rear end of the block to make room for the spring. The passage of the shaft 14 through the central portion of the bed will not materially weaken the structure because the greatest stresses exist near the upper and lower surfaces of the bed. In the central region there is a neutral zone where the material does not undergo any appreciable strain, and from where it may be removed to make room for the shaft 14 without materially weakening the construction.

In order to prevent too much friction between the flexible bands 17 and 18 and the upper surface of the bed, a slight amount of metal may be ground away from the under surfaces of the guides 11 and 12 throughout the areas covered by these bands.

Clips 21 and 22 may be secured over the side edges of the bed 5, not only to form metal bearings for the shaft 14 and connections for the braces 6 and 7, but also to increase the rigidity of the bed.

Upon the guides 11 and 12 is mounted a lens supporting pedestal comprising a pair of uprights 23 and 24 secured to a base 25 of inverted channel form, which is seated directly on the guides 11 and 12 and drawn down positively upon these guides by the inclined clamping jaws 26 and 27, secured respectively to slidable plates 28 and 29 which are confined within the channel of the base 25 to transverse sliding movement therein. The direct engagement of the channel shaped base 25 with the guides 11 and 12 makes an exceedingly rigid construction, which will not wear loose as is usually the case with the cameras now on the market.

A pair of manually operated levers 30 and 31 are pivotally mounted on the upper surface of the base 25, and to these levers are secured depending bars 32 and 33 which pass through suitable openings in the base 25 and engage the clamping jaws 26 and 27 respectively to control the movements of the latter. An expansible spring 34 is positioned between the levers 30 and 31 for keeping these levers, together with the jaws 26 and 27, normally expanded. When it is desired to adjust the pedestal along the guides 11 and 12 the levers 30 and 31 are manually contracted, whereby the jaws 26 and 27 are drawn together and their hold on the guides 11 and 12 released. The jaws 26 and 27 should make angles of about 45 degrees with the plane of the base, and should preferably diverge downwardly between the upwardly converging edges of the guides 11 and 12.

In order to prevent any lateral turning of the pedestal and to maintain the lens at all times in exact parallelism with the sensitized surface of the plate or film, I provide a pair of closely adjacent guide rails 36 and 37 arranged centrally along the outer half of the bed, and adapted to receive between them a keel 35 arranged centrally and longitudinally under the pedestal. The guide rails 36 and 37 may be formed integral with the guides 11 and 12, and the keel 35 may be of such a form that it can be slid sidewise into the channel on the under side of the base 25, and when in central position it may be riveted or soldered in place.

Claims:
1. A pedestal comprising a base, a pair of clamping jaws depending therefrom, at angles of about 45 degrees with the plane of the base, and manually operable means for simultaneously expanding or contracting both of the jaws rectilinearly in opposite directions relative to the base.

2. A pedestal comprising a base in the form of an inverted channel with the free edges extending towards each other on the under side thereof so as to form retaining flanges, a pair of plates disposed within the channel of the base, a clamping jaw carried by each of said plates and depending therefrom and making an angle of about 45 degrees with the plane of the base, and means for expanding or contracting said jaws.

3. In a camera a bed having a pair of spaced apart guides extending throughout substantially the entire length thereof, a pair of closely adjacent rails extending along the middle portion of the outer half thereof, a pedestal adapted to be adjustably mounted upon said guides, and a keel secured to the under surface of the pedestal and adapted to be guided between said rails while the pedestal is seated on the guides.

4. A pedestal comprising a base in the form of an inverted channel with the free edges extending towards each other on the under side thereof so as to form retaining flanges, a pair of plates disposed within the channel of the base, said plates having overlapping extensions within said channel, a clamping jaw carried by each of said plates and extending downwardly therefrom and making an angle of about 45 degrees with the plane of the base, and manually controlled means mounted on the upper surface of said base for expanding or contracting said jaws.

5. In a camera a bed having a pair of spaced apart guides extending throughout substantially the entire length thereof, a pedestal adapted to be adjustably mounted upon said guides, and additional guiding means along the longitudinal center line of the bed and adapted to engage a portion of said pedestal near the center thereof to prevent lateral turning of the pedestal.

6. In a camera a bed having a pair of spaced apart guides extending throughout substantially the entire length thereof, a pedestal adapted to be adjustably mounted upon said guides, additional guiding means along the longitudinal center line of the bed, and a depending keel secured under the central portion of the pedestal and adapted to engage said additional guiding means to prevent lateral turning of the pedestal.

7. A camera comprising a bed with a bifurcated outer end, a member slidable within the bifurcated portion, rearwardly extending guide bars secured to said slidable member and slidably engaging the central portion of the bed, and means on said bed for adjusting said member and said guide bars longitudinally thereof.

8. A camera comprising a bed provided with a bifurcated outer end, a member slidable in the bifurcated portion, a single shoulder formed on each side of the slidable member and on each adjacent edge of the bifurcated portion of the bed, a pair of plates with the lateral edges thereof bent at angles of about 45 degrees with the plane of the bed and secured to the slidable member so as to overlap the bifurcated portion of the bed, and means connected with said plates and said slidable member for adjusting said slidable member longitudinally.

9. A camera comprising a pivoted bed with a bifurcated outer end and guiding abutments secured near the central portion of the bed, a member slidable in the bifurcated portion and underlapping the lower side thereof, a pair of plates secured to the upper surface of said member and overlapping the bifurcated portion of the bed, a lateral edge of each plate being bent at an angle of about 45 degrees with the plane of the bed, the plates being provided with rearward extensions guided by the guiding abutments, a shaft journaled in the bed, a flexible band connected to said slidable member and wound upon said shaft, and a flexible band connected to the rearward extension of each of said plates and wound upon said shaft.

10. A pedestal for supporting the lens of a camera comprising a base in the form of an inverted channel with the free edges extending towards each other on the under side thereof so as to form retaining flanges, a pair of plates disposed within the channel of the base, a clamping jaw carried by each of said plates and presenting oppositely inclined surfaces, and means for expanding or contracting said jaws.

11. A pedestal for supporting the lens of a camera comprising a base in the form of an inverted channel with the free edges extending towards each other on the under side thereof so as to form retaining flanges, a pair of plates slidably disposed within the channel of the base, a clamping jaw carried by each of said plates and presenting oppositely inclined surfaces, and means for simultaneously expanding or contracting said jaws by moving both of them rectilinearly relative to said base in opposite directions.

12. In a camera a pivoted bed having its outer end bifurcated, a member slidable within the bifurcated portion thereof, a pair of metal guide bars secured to the upper surface of said member and extending rearwardly beyond the latter, abutments secured to the upper surface of the bed near the center thereof and slidably engaging the guide bars, a transverse shaft passing through the central neutral zone of the bed and having a thumb wheel on one end thereof, and means comprising a flexible member wound upon said shaft for adjusting the position of said guide bars and slidable member.

13. In a camera a pivoted bed having its outer end bifurcated, a member slidable within the bifurcated portion thereof, a pair of metal guide bars secured to the upper surface of said member and extending rearwardly beyond the latter, abutments secured to the upper surface of the bed near the center thereof and slidably engaging the guide bars, a transverse shaft passing through the central neutral zone of the bed and having a thumb wheel on one end thereof, and means operated by said shaft for adjusting the position of said guide bars and slidable member.

14. In a camera a pivoted bed having its outer end bifurcated, a member slidable within the bifurcated portion thereof and underlapping the adjacent bifurcated portions of the bed, a pair of metal guide bars secured to the upper surface of said member and overlapping the adjacent bifurcated portions of the bed and extending rearwardly beyond the slidable member, abutments secured to the upper surface of the bed near the center thereof and slidably engaging the guide bars, a transverse shaft passing through the central neutral zone of the bed and having a thumb wheel on one end thereof, and means operated by said shaft for adjusting the position of said guide bars and slidable member.

15. In a camera a pivoted bed having its outer end bifurcated, a member slidable within the bifurcated portion thereof, a pair of metal guide bars secured to the upper surface of said member and extending rearwardly beyond the latter, abutments secured to the upper surface of the bed near the center thereof and slidably engaging the guide bars, a transverse shaft passing through the central zone of the bed and having a thumb wheel on one end thereof, a pair of flexible bands wound upon said shaft and terminally connected to the rear ends of the guide bars, and a flexible band wound upon said shaft and terminally connected to the slidable member.

GRACE L. BEAN.